United States Patent [19]

Horiike et al.

[11] Patent Number: 4,984,650

[45] Date of Patent: Jan. 15, 1991

[54] MOTORCYCLE

[75] Inventors: Satoru Horiike, Tokyo; Hiroo Takemura, Asaka; Toshiteru Yamamoto, Saitama, all of Japan

[73] Assignee: Honda Giken Kogyo Kabushiki Kaisha, Tokyo, Japan

[21] Appl. No.: 327,452

[22] Filed: Mar. 22, 1989

[30] Foreign Application Priority Data

| Mar. 23, 1988 | [JP] | Japan | 63-067213 |
| May 16, 1988 | [JP] | Japan | 63-116861 |
| Jun. 10, 1988 | [JP] | Japan | 63-141481 |

[51] Int. Cl.⁵ ............................................. B62D 61/02
[52] U.S. Cl. .................................................. 180/227
[58] Field of Search ............... 180/219, 227, 228, 215, 180/213, 210; 280/277, 282, 283, 285, 286

[56] References Cited

U.S. PATENT DOCUMENTS

| 2,721,745 | 10/1955 | Torre | 180/219 |
| 3,912,031 | 10/1975 | Goulet | 180/9.26 |
| 3,938,609 | 2/1976 | Kensaka et al. | 180/210 |
| 4,448,436 | 5/1984 | Ohzono | 280/282 |
| 4,460,057 | 7/1984 | Kohgama | 180/210 |
| 4,541,501 | 9/1985 | Kawasaki | 180/215 |
| 4,666,018 | 5/1987 | Shibaga | 180/213 |

FOREIGN PATENT DOCUMENTS 2583704 12/1986 France .

Primary Examiner—Charles A. Marmor
Assistant Examiner—Richard Camby
Attorney, Agent, or Firm—Armstrong, Nikaido, Marmelstein, Kubovcik & Murray

[57] ABSTRACT

A motorcycle has a frame assembly supporting a power unit, which is disposed between front and rear wheels, for driving the rear wheel. The frame assembly comprises a front frame supporting the front wheel and a rear frame supporting the rear drive wheel. The front frame is coupled to the rear frame and is swingable with respect to the rear frame laterally of the frame assembly. The rear wheel has a substantially flat tire for suppressing banking movement of the rear frame. The front wheel has a round tire for allowing banking movement of the front frame. The motorcycle also includes a rider's seat mounted on the front frame. A damping device is disposed between the front frame and the rear frame for damping banking movement of the front frame.

16 Claims, 6 Drawing Sheets

MOTORCYCLE

BACKGROUND OF THE INVENTION

1. Field of the Invention

The present invention relates to a motorcycle.

2. Description of the Prior Art

When a motorcycle corners, the motor banks, i.e., is inclined laterally, to produce a centripetal force which counterbalances the centrifugal force generated on the motorcycle which depends on the weight of the motorcycle and the rider, the running speed of the motorcycle, and the radius of the cornering circle. Generally, the running speed of the motorcycle is reduced when the motorcycle corners.

The applicant has proposed a motorcycle capable of cornering at high speeds in races or other high-speed occurrences. The proposed motorcycle has a motorcycle wheel having a round tire and a rear frame supporting a rear wheel having a flat tire. The front and rear frames are interconnected in a longitudinal direction of the motorcycle. The front frame can be inclined laterally about the coupling shaft by which the front frame is coupled to the rear frame. The rear wheel has a large width in order to limit the banking of the rear frame about the coupling shaft. The frame assembly also includes a seat frame with a front portion which is swingable about a vertical shaft mounted on the front frame.

During cornering, the front frame is controlled to bank, whereas the rear wheel, which does not bank, maintains contact with the road through a sufficiently large contact area. The seat frame is swung laterally with the banking front frame to balance the centrifugal force acting on the motorcycle during the turn, thus allowing the motorcycle to run at an increased speed through the turn.

Since the front frame is tiltable with respect to the rear frame and the seat frame is swingable about the vertical shaft on the front frame, it is desirable that the front frame be prevented from making unwanted banking motion and that the seat frame be prevented from swinging unnecessarily while the motorcycle is running.

When the motorcycle makes a turn or corners, the rider's body tilts laterally with the front frame and the seat frame. To assist the rider in tilting his or her body, the motorcycle has footsteps attached to the seat frame for the rider's feet to be placed thereon. Therefore, a gear shift pedal, for operating a transmission of a power unit on the motorcycle, and other foot-operated control pedals should preferably be located near the footsteps. If the transmission and other devices to be controlled by these control pedals are installed on the rear frame which does not bank, the control pedals and the controlled devices should be operatively connected so as not to interfere with the movement of the seat frame, which banks with the front frame and is swingable about the vertical shaft.

For driving the motorcycle efficiently at a high speed, large drive forces from the rear drive wheel should effectively be transmitted to the front frame which is tiltable with respect to the rear frame.

SUMMARY OF THE INVENTION

In view of the aforesaid demands, it is an object of the present invention to provide a motorcycle having a front frame which can bank with respect to a rear frame when the motorcycle corners. The motorcycle is thus capable of running at a high speed during cornering.

Another object of the present invention is to provide a motorcycle having a front frame which can bank with respect to a rear frame when the motorcycle corners. The motorcycle is arranged to suppress unnecessary banking movement of the front frame while the motorcycle is running.

Still another object of the present invention is to provide a motorcycle having a front frame which can bank with respect to a rear frame when the motorcycle corners. The motorcycle is arranged to suppress unnecessary swinging movement of a seat frame while the motorcycle is running.

Yet another object of the present invention is to provide a motorcycle having a front frame which can bank with respect to a rear frame when the motorcycle corners. The motorcycle has a control member mounted on a seat frame of the front frame for easily controlling a power unit mounted on the rear frame, which does not bank.

A further object of the present invention is to provide a motorcycle having a front frame which can bank with respect to a rear frame when the motorcycle corners. The motorcycle is arranged to transmit drive forces efficiently from a rear wheel, which does not bank, to the front frame.

To achieve the above objects, in accordance with the present invention, the motorcycle comprises a front wheel, a rear wheel drive and a power unit positioned between the front and rear wheels for driving the rear drive wheel. A frame assembly supports the power unit. The frame assembly comprises a front frame supporting the front wheel and a rear frame supporting the rear drive wheel. The front frame is coupled to the rear frame and is swingable, with respect to the rear frame, laterally of the frame assembly. The rear wheel has a substantially flat tire for suppressing banking movement of the rear frame. The front wheel has a round tire for allowing banking movement of the front frame. A rider's seat is mounted on the front frame. A damping device is disposed between the front frame and the rear frame for damping banking movement of the front frame.

The front frame and the rear frame are connected to each other by a coupling shaft which extends longitudinally of the frame assembly. The damping device has a device for damping banking movement of the front frame about the coupling shaft. The front frame comprises a main frame supporting the front wheel and a seat frame supporting the rider's seat. The seat frame is attached to the main frame and extends from the main frame upwardly of the rear frame.

The seat frame is supported on the main frame for swinging movement laterally of the frame assembly. The motorcycle further includes a second damping device disposed between the seat frame and the main frame for damping swinging movement of the seat frame. The seat frame is supported for swinging movement about a substantially vertical shaft mounted on the main frame.

With the above arrangement, when the motorcycle runs along a straight course, the first mentioned damping device dampens unnecessary banking movement of the front frame to keep the front frame in a certain position. Upon cornering, the front frame banks while its banking movement is limited. The banking movement of the front frame can thus be easily controlled.

With the seat frame being swingable, when the motorcycle runs along a straight course, the second mentioned damping means limits unnecessary swinging movement of the seat frame to maintain the seat frame in a certain position. When the motorcycle corners, the swinging movement of the seat frame is limited and can be easily controlled.

The power unit is mounted on the rear frame. The seat frame has a footstep associated with a foot-operated control movement which is controllable by a foot of a rider sitting in the rider's seat for operating the power unit. The seat frame also includes a flexible connecting device for connecting the control element and the power unit. The connecting device allows the seat frame to bank with the front frame during cornering of the motorcycle.

The seat frame is swingably attached to the main frame of the front frame. The power unit is mounted on the rear frame. The seat frame has a footstep associated with a foot-operated control element which is controllable by a foot of a rider sitting in the rider's seat for operating the power unit. The seat frame also includes a flexible connecting device for connecting the control element and the power unit. The connecting device allows the seat frame to bank with the front frame and to swing during cornering of the motorcycle.

With the above arrangement, the banking movement of the front frame is effected with respect to the rear frame while the banking movement is being suppressed by the first mentioned damping device. During the banking movement, the power unit can easily be controlled by the foot-operated control element on the footstep of the front frame. If the seat frame is swingable with respect to the main frame of the front frame, the banking movement of the main frame is effected with respect to the rear frame while the banking movement is suppressed by the first mentioned damping device, and the swinging movement of the seat frame is effected while being suppressed by the second mentioned damping device. During the above banking movement and swinging movement, the power unit can easily be controlled by the foot-operated control elements on the foot-steps of the seat frame.

Furthermore, the motorcycle further includes a head pipe supporting a front fork by which the front wheel is supported on the front frame. The front frame is of a substantially V-shaped configuration, as viewed in plan, which extends from a front end thereof, connected to the head pipe, to a vertex of the V-shaped configuration at a rear end.

The rear frame has a front portion on which the coupling shaft is mounted and a rear portion on which the rear wheel is supported by a rear fork.

While the banking movement of the front frame with respect to the rear frame is being suppressed by the first mentioned damping device, the drive force from the rear drive wheel, supported on the rear frame, is effectively transmitted to the front frame through the coupling shaft by which the front and rear frames are interconnected.

The above and other objects, features and advantages of the present invention will become more apparent from the following description when taken in conjunction with the accompanying drawings in which preferred embodiments of the present invention are shown by way of illustrative example.

DETAILED DESCRIPTION

FIGS. 1 through 4 show a motorcycle according to an embodiment of the present invention.

Figure 1:
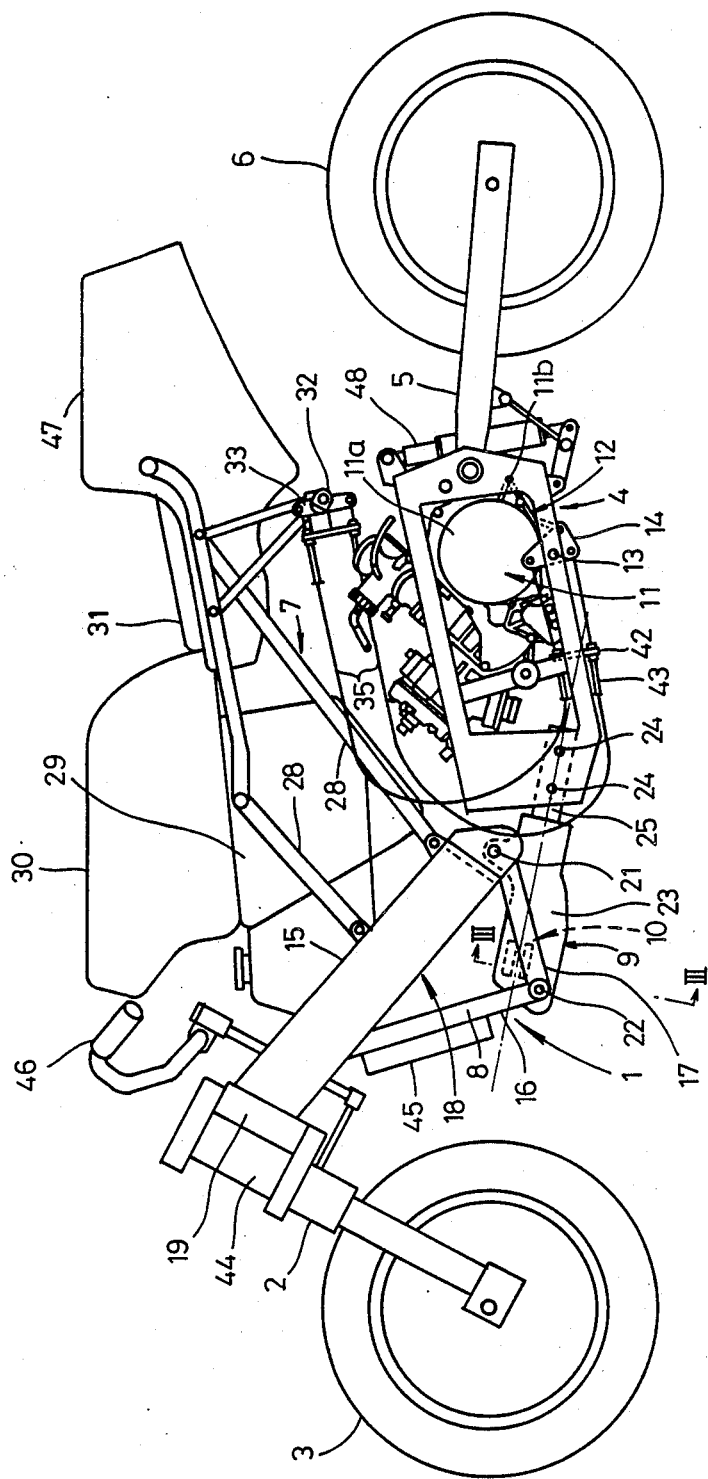
FIG. 1 is a side elevational view of a motorcycle according to an embodiment of the present invention.

As shown in FIG. 1, the motorcycle has a frame assembly comprising a front frame 1 on which a front wheel 3, having a round tire, is supported by an inverted front fork 2. A rear frame 4 on which a rear wheel 3, having a wide flat tire, is supported by a rear swingarm 5. A seat frame 7 is attached to a main frame 8 of the front frame 1 and extends upwardly of the rear frame 4.

Figure 2:
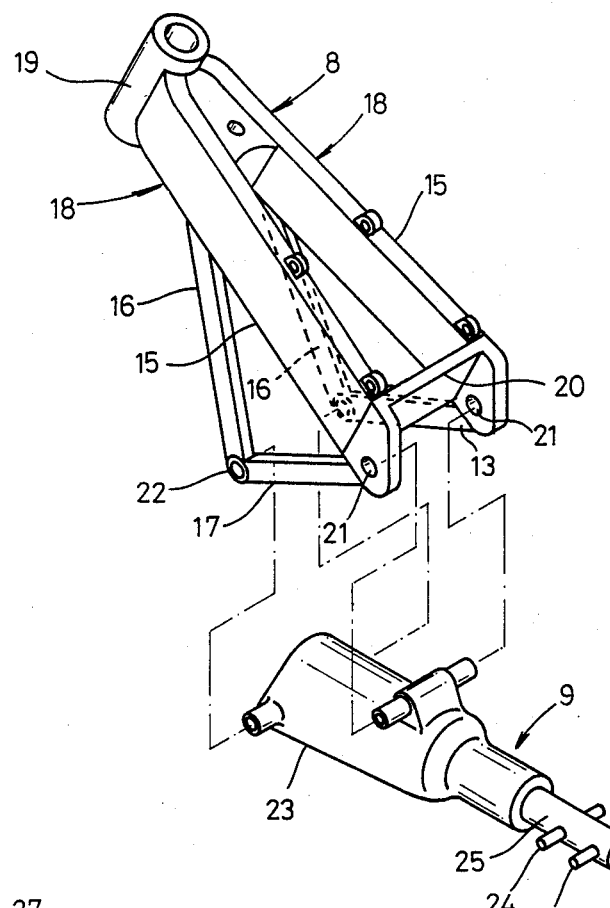
FIG. 2 is an exploded perspective view of a front frame of the motorcycle shown in FIG. 1.
Figure 3:
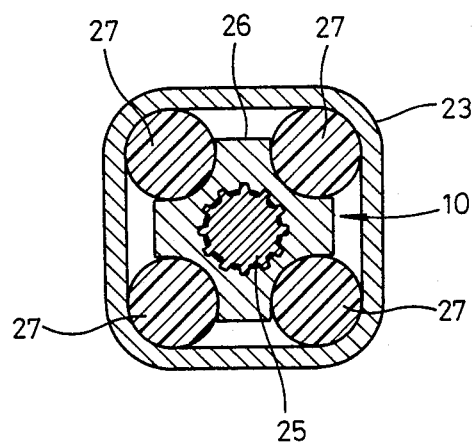
FIG. 3 is an enlarged cross-sectional view taken along line III—III of FIG. 1.

As shown in FIGS. 1 through 3, the front frame 1 and the rear frame 4 are longitudinally coupled to each other by means of a coupling shaft 9. The rear wheel 6, with the wide flat tire, prevents the rear frame 4 from swinging laterally, whereas the front frame 1 is swingable about the coupling shaft 9. A Neidhart mechanism 10 is disposed in the coupling shaft 9 for limiting swinging movement of the front frame 1 of the coupling shaft 9.

A power unit 11, including an engine, is installed on the rear frame 4. The power unit 11 also includes a transmission 11a having a control shaft 11b. A gear shift arm 14 is angularly movable about a support shaft 13 on the rear frame 4, and is connected to a gear shift link 12 which is coupled to the control shaft 11b for effecting a gear shift in the transmission 11a.

More specifically, as shown in FIGS. 1 and 2, the main frame 8 of the front frame 1 comprises a pair of triangular side frame units 18 each having an upper member 15, a lower member 16, and a bottom member 17. The side frame units 18 are joined in a substantially V-shaped configuration, as viewed in plan, to a head pipe 19 supported on an upper end of the front fork. The head pipe 19 serves as a vertex of the V shape of the side frame units 18. The upper members 15 have respective rear ends joined to each other by means of a transverse joint 20.

The coupling shaft 9 has a swing member 23 supported on the front frame 1 by means of supports 21 on the lateral sides of the joint 20 and supports 22 on the lower ends of the lower members 16. The swing member 23 is disposed over a fixed shaft 25 of the coupling shaft 9 which is fixed to the rear frame 4 by fixing means 24. The swing member 23 is swingably coupled to and around the fixed shaft 25 by means of the Neidhart mechanism 10.

As shown in FIG. 3, the Neidhart mechanism 10 comprises a Neidhart base 26 of a criss-cross cross section disposed in the swing member 23 and securely mounted on the fixed shaft 25. Neidhart rubber members 27 are disposed around the Neidhart base 26 at angularly spaced intervals and are interposed between recesses defined in the outer surface of the Neidhart base 26 and the inner surface of the swing member 23. When the front frame 1 swings about the coupling shaft 9, the swing member 23 turns around the Neidhart bases 26 while compressing the Neidhart rubber members 27 which serve to limit the angular movement of the swing member 23.

The seat frame 7 attached to the main frame 8 extends from the rear end of the main frame 8 upwardly of the rear frame 4. The seat frame 7 has a pair of frame members 28 extending longitudinally of the motorcycle. Each frame member 28 is of a substantially rectangular shape in side elevation. A fuel tank 29 is disposed between the frame members 28. A knee grip 30 is disposed on the fuel tank 29 and extends over and between the frame members 28. A rider's seat 31 and pair of laterally spaced footsteps 32 are mounted on the seat frame 7 behind the knee grip 30. A gear shift pedal lever 33 is swingably mounted coaxially on one of the footsteps 32 as a control element for operating the transmission 11a of the power unit 11.

Figure 4:
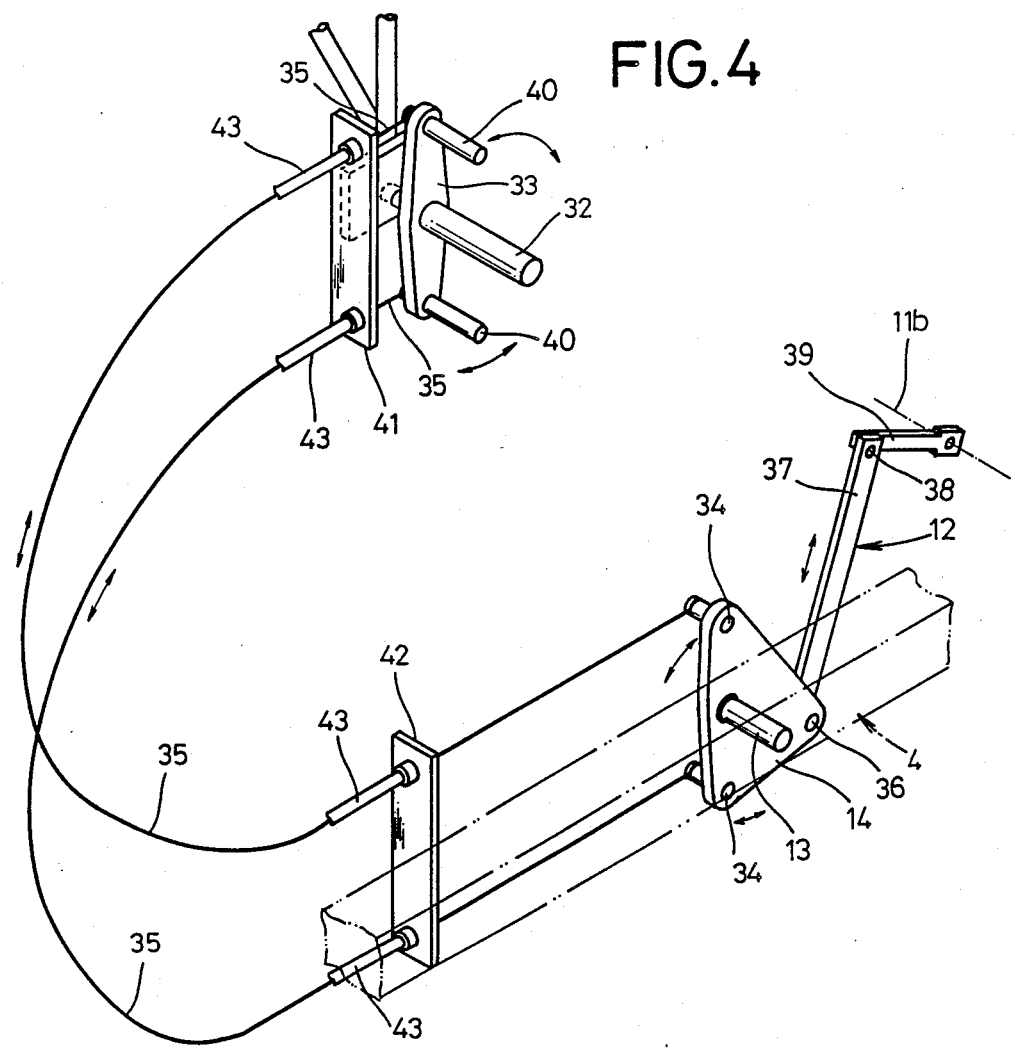
FIG. 4 is a perspective view of a gear shift mechanism of the motorcycle shown in FIG. 1.

As shown in FIGS. 1 and 4, the gear shift arm 14 is swingable about the support shaft 13, which projects inwardly from the rear frame 4. The gear shift arm 14 has a pair of attachment pins 34 which are spaced upwardly and downwardly from the support shaft 13. The attachment pins 34 are connected to the gear shift pedal level 33 through a pair of flexible cables 35 which serve as a connecting means. The gear shift link 12 is disposed rearwardly of the gear shift arm 14. The gear shift link 12 comprises a first link member 37 swingably attached to the gear shift arm 14 by means of a pivot pin 36, and a second link member 39 coupled to a distal end of the first link member 37 by means of a pivot pin 38. The second link member 39 is connected to the control shaft 11b of the transmission 11a.

The gear shift pedal 33 has a pair of control pedals 40 positioned upwardly and downwardly, respectively, of the footstep 32, and projecting outwardly. The flexible cables 35 have ends joined to the attachment pins 34, respectively on the gear shaft arm 14 and opposite ends coupled to the inner ends of the control pedals 40. A cable support plate 41 is attached to the seat frame 7 in front of the gear shift pedal level 33, and another cable support plate 42 is mounted on an inner surface of the rear frame 4 in front of the gear shift arm 14. Between these cable support plates 41, 42, two vertically spaced flexible tubes 43 extend through which the flexible cables 35 are guided.

As shown in FIG. 1, the motorcycle further has a front wheel damper 44, an engine radiator 45, a front wheel steering handlebar 46, a rear cowl 47 and a rear wheel damper 48.

Operation of the motorcycle thus constructed will be described below.

When the motorcycle corners to makes a turn, the front wheel 3 banks with the front frame 1. The rear wheel 6 and the rear frame 4 do not bank since the front frame 1 turns about the coupling shaft 9 and also since the rear wheel 6 has the wide flat tire.

When the front frame 1 banks while its swinging movement about the coupling shaft 9 is being limited by the Neidhart mechanism 10, the seat frame 7 is also caused to bank with the front frame 1. At this time, the front frame 1 and the seat frame 7 do not abruptly swing since their swinging movement is limited by the Neidhart mechanism 10.

The drive force from the rear wheel 6 is transmitted via the rear frame 4 and the fixed shaft 25 to the swing member 23 coupled to the front frame 1. The drive force is further transmitted via the supports 21, 22 to the upper and lower members 15, 16 of the main frame 8.

Since the main frame 8 is V-shaped, the drive force applied to the main frame 8 is concentrated on the head pipe 19 to push the front fork 2 forwardly, thus rotating the front wheel 3. The weight of the rider on the seat frame 7 and the weight of the seat frame 7 itself act on the front frame 1 to lower the same, so that the head pipe 19 and the front fork 2 are lowered to press the front wheel 3 against the road surface for increasing the grip of the front wheel 3 on the road surface. Inasmuch as the drive force from the rear wheel 6 is transmitted from the coupling shaft 9 via the supports 21, 22 and the components of the front frame 1 to the head pipe 19, the drive force is effectively transmitted to the front wheel 3.

To effect a gear shift, the rider's foot operates the control pedals 40 to turn the gear shift lever 33 which causes the flexible cables 35 to turn the gear shift arm 14 on the rear frame 4. When the gear shift arm 14 is turned, the first and second link members 37, 39 of the gear shift link 12 are angularly moved to rotate the control shaft 11b for shifting the gears in the transmission 11a.

As the wide rear wheel 6 which is a drive wheel does not bank, its area of contact with the road is sufficiently maintained during cornering, and hence the drive force of the rear wheel 6 can effectively be utilized and transmitted to the front wheel 3. A banking movement of the front frame 1 causes the seat frame 7 to also bank with the front frame 1. Therefore, the center of gravity of the motorcycle can largely be shifted laterally, thereby making it possible for the motorcycle to corner at a high speed.

Since the gear shift pedal lever 33 moves with the seat frame 7, the rider can easily effect a gear shift through the gear shift pedal lever 33.

Although not shown, a brake pedal, which is also a control element having the sam structure as the gear shift pedal lever 33, is mounted on the other footstep attached to the seat frame 7. Accordingly, the rider can brake the motorcycle through the brake pedal while the rider's body shifts with the seat frame 7. Therefore, gear shifting and braking can easily be carried out by the rider on the banking seat frame 7 while the motorcycle is running at a high speed around corners.

A motorcycle according to another embodiment of the present invention will be described below with reference to FIGS. 5 through 7.

The motorcycle of this embodiment is basically similar in structure to the motorcycle of the preceding embodiment shown in FIGS. 1 through 4, except for the front frame 1, the seat frame 7 which is swingably mounted on the front frame 1, and a means for damping the swinging movement of the seat frame 1. Therefore, those parts shown in FIGS. 5 through 7 which are identical to those of the preceding embodiment are denoted by identical reference numerals, and will not be described in detail.

Figure 5:
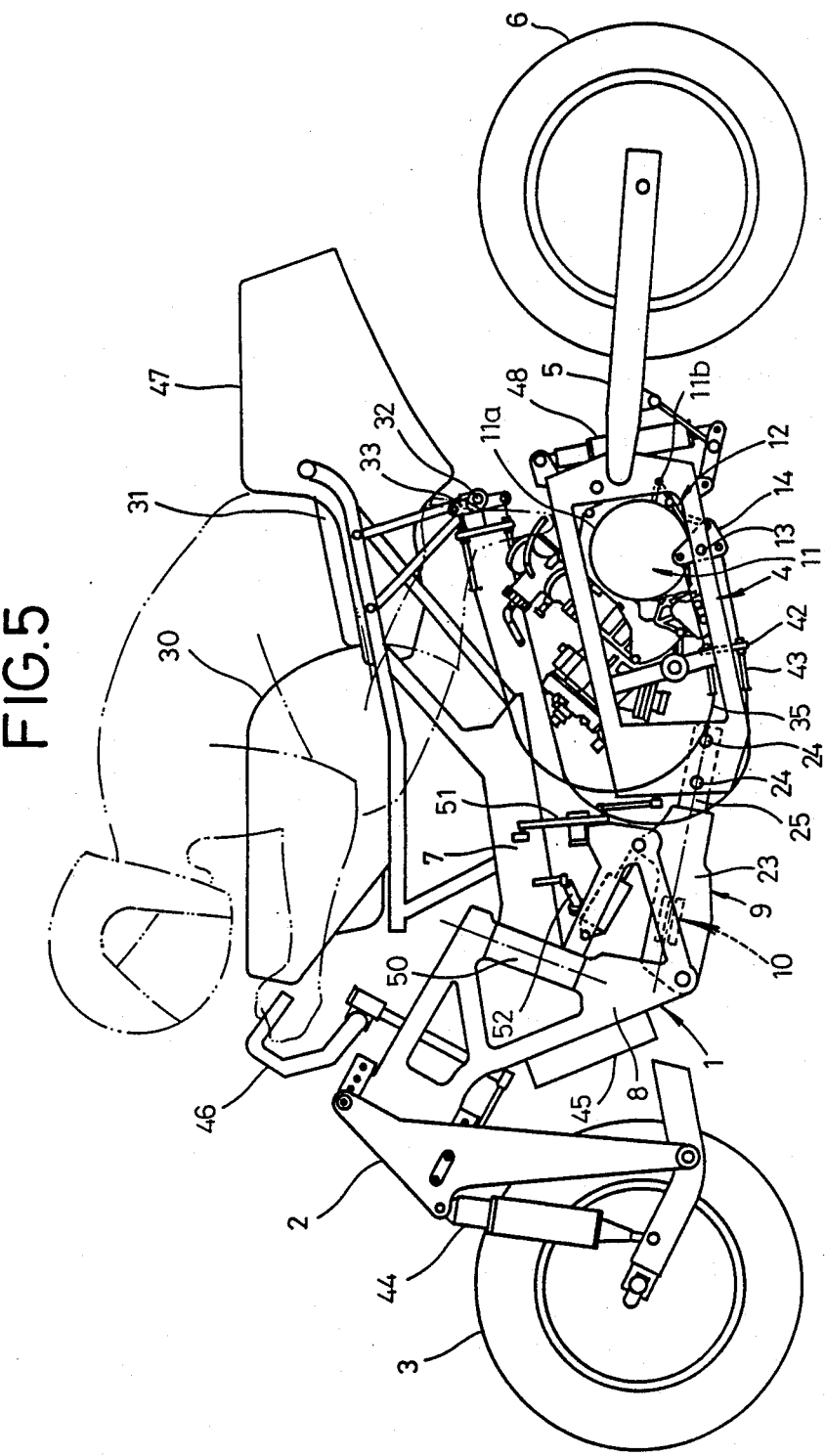
FIG. 5 is a side elevational view of a motorcycle according to another embodiment of the present invention.
Figure 6:
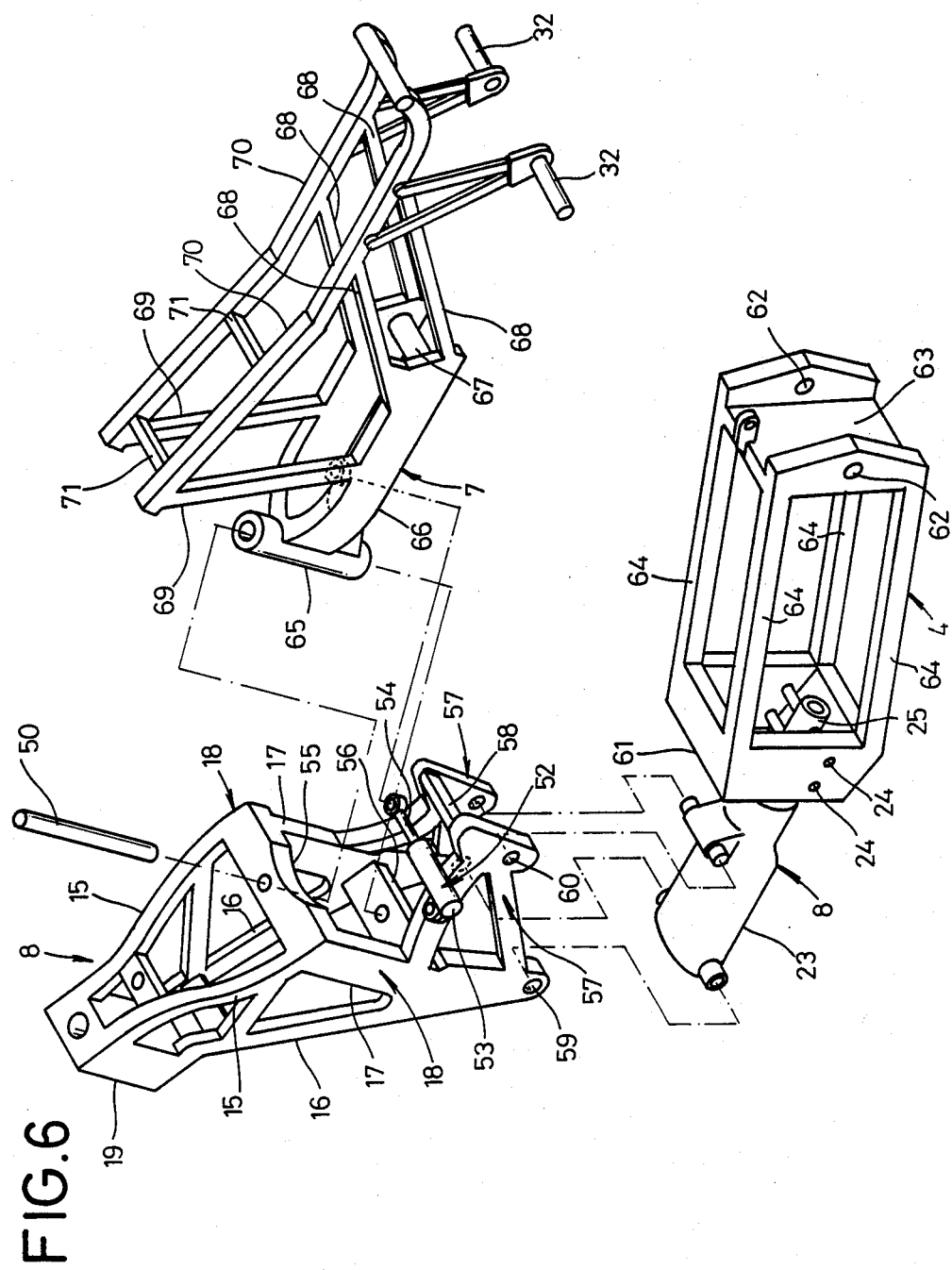
FIG. 6 is an exploded perspective view of a motorcycle frame assembly of the motorcycle illustrated in FIG. 5.

As shown in FIGS. 5 and 6, a seat frame 7 is swingably mounted at a front end on an attachment shaft 50 which is substantially vertically disposed in the motorcycle frame assembly. The seat frame 7 can bank with a front frame 1 and is also caused to swing about the attachment shaft 50 by a link device 51 joined to a rear frame 4 dependent on the banking movement of the front frame I. An expandable and contractible damper 52 is connected between the front frame 1 and the seat frame 7 for limiting the swinging movement of the seat frame 7 about the attachment shaft 50. As shown in FIGS. 6 and 7, the damper 52 is of a cylinder/piston assembly filled with working oil and having cylinder 53 and a piston rod 54. The damper 52 dampens the movement of the piston rod 54 in a direction out of the cylinder 53 and returns the piston rod 54 to a predetermined projected position.

The cylinder 53 is fixed to a left-hand side of the front frame 1, and the piston rod 54 is fixed to a right-hand side of the seat frame 7. Thus, the damper 52 can limit the swinging movement of the seat frame 7 about the attachment shaft 50.

The damper 52 for damping the swinging movement of the seat frame 7 is not limited to the illustrated construction, but may comprise a Neidhart mechanism, similar to the mechanism 10 shown in FIG. 3, mounted on the attachment shaft 50.

The front frame 1, the rear frame 4, and the seat frame 7 will be described in detail with reference to FIGS. 6 and 7.

The front frame 1 has a maim frame 8 comprising a pair of laterally spaced side frame units 18 of a substantially triangular shape when viewed in side elevation. Each unit 18 is composed of an upper member 15, a lower member 16, and a bottom member 17. The side frame units 18 are joined in a V-shape when viewed in plan to a head pipe 19 supported on the upper end of a front fork 2. The head pipe 19 is at the vertex of the V shape. The bottom members 17 are joined to each other at their upper ends and intermediate portions by means of transverse connecting members 55, 56 with the attachment shaft 50 vertically mounted centrally thereon. A pair of support frame members 57, each of a triangular shape, are joined to the side frame units 18. The support frame members 57 extend rearwardly from the lower portions of the bottom members 17. The support frame members 57 have rear ends joined to each other by means of a transverse connecting member 58.

The side frame units 18 have supports 59 on their lower portions. The support frame members 57 have supports 60 on their rear upper portions. The coupling shaft 9 has a front lower portion and a rear upper portion which are sandwiched and supported in the front frame 1 by the supports 59, 60.

The rear frame 4 is of a unitary box-shaped structure as shown in FIG. 6. The rear frame 4 comprises a front end portion 61 supporting the fixed shaft 25 of the coupling shaft 9, a rear end portion 63 having supports 62 by which the rear swingarm 5 is supported, and connecting members 64 interconnecting the front and rear end portions 61, 63.

As shown in FIG. 6, the seat frame 7 comprises a support member 66 of a substantially U-shaped configuration when viewed in plan extending rearwardly from a shaft sleeve 65 through which the attachment shaft 50 extends. A connecting member 67 interconnects a pair of laterally spaced rear ends of the support member 66. Two pairs of laterally spaced rear leg members 68 extend rearwardly and upwardly from the rear ends of the support member 66. A pair of laterally spaced front leg members 69 extend upwardly from a front portion of the support member 66. A pair of upper members 70 are supported on the leg members 68, 69. Transverse connecting members 71 interconnect the upper members 70.

Figure 7:
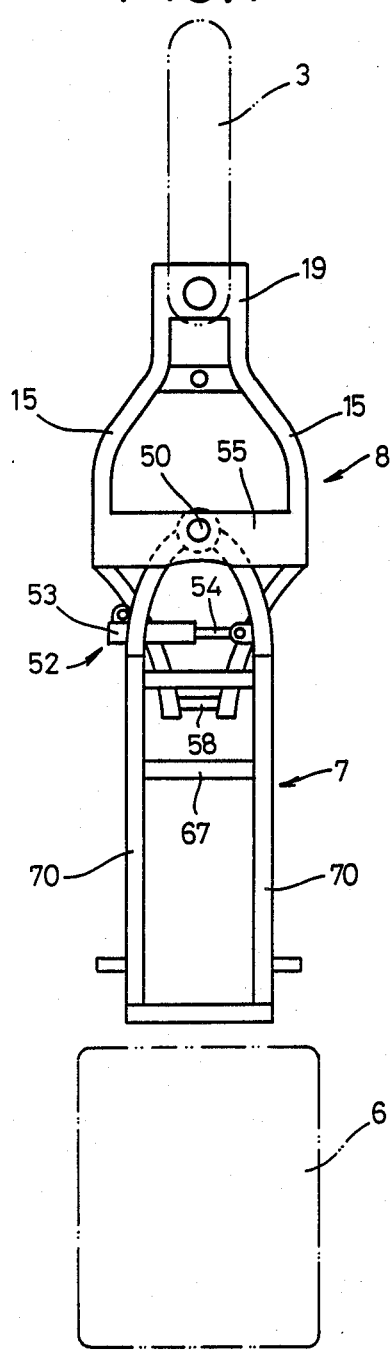
FIG. 7 is a plan view of interconnected front and rear frames of the frame assembly shown in FIG. 6.

Operation of the motorcycle shown in FIGS. 5 through 7 is as follows:

When the motorcycle corners or makes a turn, the front wheel 3 banks with the front frame 1. The rear wheel 6 and the rear frame 4 do not bank since the front frame 1 turns about the coupling shaft 9 and also since the rear wheel 6 has a wide flat tire.

When the front frame 1 banks while a swinging movement about the coupling shaft 9 is limited by the Neidhart mechanism 10, the seat frame 7 is also caused to bank with the front frame. The seat frame 7 is caused by the link device 51 to swing in the same direction as the direction in which the front frame 1 banks. However, the swinging movement of the seat frame 7 is limited by the damper 52.

When the motorcycle runs along a zigzag course or makes successive turns, the front frame 1 banks in alternately different directions. The damper 52 limits unwanted swinging movement of the seat frame 7 about the attachment shaft 50, and assists the seat frame 7 in banking in unison with the front frame 1, thereby facilitating the zigzag running of the motorcycle.

When the front frame 1 slightly banks while the motorcycle is running along a straight course, the seat frame 7 is caused to swing by the link device 51, and the damper 52 produces reactive forces tending to return the seat frame 7 back to a position on the central line of the motorcycle which interconnects the front and rear wheels 3, 6. Therefore, the motorcycle is allowed to easily run along a straight course.

A gear shift can effect the transmission 10a by operating the control pedals 40 to turn the gear shift pedal lever 33 which causes the flexible cables 35 to turn the gear shift arm 14 thereby operating the gear shift link 12.

Since the wide rear wheel 6, which is a drive wheel, does not bank, an area of contact with the road is sufficiently maintained during cornering, and hence the drive force of the rear wheel 6 can effectively be utilized and transmitted to the front frame 1. Upon banking movement of the front frame 1, the seat frame 7 is also caused to bank with the front frame 1, and further swing about the attachment shaft 50. Therefore, the center of gravity of the motorcycle can largely be shifted laterally, thereby making it possible for the motorcycle to corner at high speeds.

Since the gear shift pedal lever 33 is moved with the seat frame 7, the rider can easily shift gears using the gear shift pedal lever 33 while the rider's body shifts with the seat frame 7.

In the above embodiments, the gear shift pedal lever 33 and the gear shift arm 14 are connected to each other by the flexible cables 35. However, the gear shift pedal lever 33 and the gear shift arm 14 may be connected by a hydraulic pressure means.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A motorcycle comprising:
   a front wheel;
   a rear drive wheel;
   a power unit for driving said rear drive wheel;
   a frame assembly supporting said power unit, said frame assembly including a front frame supporting said front wheel and a rear frame supporting said rear drive wheel, said front frame being coupled to said rear frame and swingable with respect to the rear frame laterally of said frame assembly, said rear wheel having a substantially flat tire for suppressing banking movement of said rear frame, said front wheel having a round tire for allowing banking movement of said front frame, a head pipe supporting a front fork by which said front wheel is supported on said front frame, said front frame is of a substantially V-shaped configuration when viewed in plan, said front frame having a front end connected to said head pipe at a vertex of said V-shaped configuration and having a rear end in which a coupling shaft is sandwiched between said V-shaped configuration, said coupling shaft connecting said front and rear frames to each other;
   a seat mounted on said front frame; and
   a damping means disposed between said front frame and said rear frame for damping banking movement of said front frame.

2. A motorcycle according to claim 1, wherein said coupling shaft extends longitudinally of said frame assembly, said damping means having means for damping banking movement of said front frame about said coupling shaft.

3. A motorcycle according to claim 1, wherein said front frame comprises a main frame supporting said front wheel and a seat frame supporting said seat, said seat frame being attached to said main frame and extending from said main frame upwardly of said rear frame.

4. A motorcycle according to claim 3, wherein said seat frame is supported on said main frame for swinging movement laterally of said frame assembly, said seat frame further including another damping means disposed between said seat frame and said main frame for damping swinging movement of said seat frame.

5. A motorcycle according to claim 4, wherein said seat frame is supported for swinging movement about a substantially vertical shaft mounted on said main frame.

6. A motorcycle according to claim 3, wherein said power unit is mounted on said rear frame, said seat frame having a footstep associated with a foot-operated control element which is controllable by a foot of a rider seated in said seat, said foot-operated control element for operating said power unit, said seat frame further including a flexible connecting means for connecting said foot-operated control element and said power unit, said connecting means allowing said seat frame to bank with said front frame during cornering of the motorcycle.

7. A motorcycle according to claim 4, wherein said power unit is mounted on said rear frame, said seat frame having a footstep associated with a foot-operated control element which is controllable by a foot of a rider seated in said seat, said foot-operated control element for operating said power unit, said seat frame further including a flexible connecting means for connecting said foot-operated control element and said power unit, said connecting means allowing said seat frame to bank with said front frame and to swing during cornering of the motorcycle.

8. A motorcycle comprising:
   a front wheel;
   a rear drive wheel;
   a power unit for driving said rear drive wheel;
   a seat;
   a frame assembly supporting said power unit, said frame assembly including a front frame supporting said front wheel and a rear frame supporting said rear drive wheel, said front frame including a main frame supporting said front wheel and a seat frame supporting said seat, said seat frame being attached to said main frame and extending from said main frame upwardly of said rear frame, said seat frame is supported on said main frame for swinging movement laterally of said front frame, said seat frame further including a first damping means disposed between said seat frame and said main frame for damping lateral swinging movement of said seat frame, said front frame being coupled to said rear frame and swingable with respect to the rear frame laterally of said frame assembly, said rear wheel having a substantially flat tire for suppressing banking movement of said rear frame, said front wheel having a round tire for allowing banking movement of said front frame; and
   a second damping means disposed between said front frame and said rear frame for damping banking movement of said front frame.

9. A motorcycle comprising:
   a front wheel;
   a rear drive wheel;
   a power unit for driving said rear drive wheel;
   a frame assembly supporting said power unit, said frame assembly including a front frame supporting said front wheel and a rear frame supporting said rear drive wheel, said front frame and said rear frame are connected to each other by a coupling shaft which extends longitudinally of said frame assembly, said front frame further including a head pipe supporting a front fork by which said front wheel is supported on said front frame, said front frame being of a substantially V-shaped configuration when viewed in plan, said front frame having a front end connected to said head pipe at a vertex of said V-shaped configuration and having a rear end in which said coupling shaft is sandwiched between said V-shaped configuration, said front frame being coupled to said rear frame and swingable with respect to the rear frame laterally of said frame assembly, said rear wheel having a substantially flat tire for suppressing banking movement of said rear frame, said front wheel having a round tire for allowing banking movement of said front frame;
   a seat mounted on said front frame; and
   a damping means disposed between said front frame and said rear frame for damping banking movement of said front frame, said damping means having means for damping banking movement of said front frame about said coupling shaft.

10. A motorcycle comprising:
    a front wheel;
    a rear drive wheel;
    a power unit for driving said rear drive wheel;
    a frame assembly supporting said power unit, said frame assembly including a front frame supporting said front wheel and a rear frame supporting said rear drive wheel, said front frame being coupled to said rear frame and swingable with respect to the rear frame laterally of said frame assembly, said rear wheel having a substantially flat tire for suppressing banking movement of said rear frame, said front wheel having a round tire for allowing banking movement of said front frame, a head pipe supporting a front fork by which said front wheel is supported on said front frame, said front frame is of a substantially V-shaped configuration when viewed in plan, said front frame having a front end connected to said head pipe at a vertex of said V-shaped configuration and having a rear end in which a coupling shaft is sandwiched between said V-shaped configuration, said rear frame has a front portion on which said coupling shaft is mounted and a rear portion on which said rear wheel is supported by a rear fork;

a seat mounted on said front frame; and a damping means disposed between said front frame and said rear frame for damping banking movement of said front frame.

11. A motorcycle according to claim 10, wherein said front frame and said rear frame are connected to each other by said coupling shaft which extends longitudinally of said frame assembly, said damping means having means for damping banking movement of said front frame about said coupling shaft.

12. A motorcycle according to claim 10, wherein said front frame comprises a main frame supporting said front wheel and a seat frame supporting said seat, said seat frame being attached to said main frame and extending from said main frame upwardly of said rear frame.

13. A motorcycle according to claim 12, wherein said seat frame is supported on said main frame for swinging movement laterally of said frame assembly, said seat frame further including a second damping means disposed between said seat frame and said main frame for damping swinging movement of said seat frame.

14. A motorcycle according to claim 13, wherein said seat frame is supported for swinging movement about a substantially vertical shaft mounted on said main frame.

15. A motorcycle according to claim 12, wherein said power unit is mounted on said rear frame, said seat frame having a footstep associated with a foot-operated control element which is controllable by a foot of a rider seated in said seat, said foot-operated control element for operating said power unit, said seat frame further including a flexible connecting means for connecting said foot-operated control element and said power unit, said connecting means allowing said seat frame to bank with said front frame during cornering of the motorcycle.

16. A motorcycle according to claim 13, wherein said power unit is mounted on said rear frame, said seat frame having a footstep associated with a foot-operated control element which is controllable by a foot of a rider seated in said seat, said foot-operated control element for operating said power unit, said seat frame further including a flexible connecting means for connecting said foot-operate control element and said power unit, said connecting means allowing said seat frame to bank with said front frame and to swing during cornering of the motorcycle.

* * * * *